(12) United States Patent
Liu et al.

(10) Patent No.: US 11,034,289 B2
(45) Date of Patent: Jun. 15, 2021

(54) PATTERN PROJECTING LAMP OF MOTOR VEHICLE

(71) Applicant: VALEO VISION SAS, Bobigny (FR)

(72) Inventors: Lixian Liu, Wuhan (CN); Xiaojuan Mou, Wuhan (CN); Yinfeng Cheng, Wuhan (CN)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 16/866,761

(22) Filed: May 5, 2020

(65) Prior Publication Data
US 2020/0262336 A1 Aug. 20, 2020

(51) Int. Cl.
| | |
|---|---|
| *B60Q 1/26* | (2006.01) |
| *F21S 41/25* | (2018.01) |
| *F21V 14/00* | (2018.01) |
| *G03B 21/14* | (2006.01) |
| *G03B 21/20* | (2006.01) |

(52) U.S. Cl.
CPC ............ *B60Q 1/2657* (2013.01); *F21S 41/25* (2018.01); *F21V 14/00* (2013.01); *G03B 21/145* (2013.01); *G03B 21/20* (2013.01)

(58) Field of Classification Search
CPC ........ B60Q 1/2657; F21V 14/00; F21S 41/25; G03B 21/20; G03B 21/145
See application file for complete search history.

(56) References Cited

U.S. PATENT DOCUMENTS

| | | | |
|---|---|---|---|
| 6,220,737 B1 | 4/2001 | Baragona | |
| 9,865,186 B2 | 1/2018 | Seal | |
| 2008/0002049 A1 | 1/2008 | Saito | |
| 2017/0329210 A1 | 11/2017 | Zawacki | |

FOREIGN PATENT DOCUMENTS

| | | |
|---|---|---|
| CN | 203732863 U | 7/2014 |
| CN | 104169999 A | 11/2014 |
| CN | 207584671 U | 7/2018 |
| FR | 2967625 A1 | 5/2012 |

OTHER PUBLICATIONS

National Intellectual Property Administration, PRC, International Search Report and Written Opinion for corresponding International Application No. PCT/CN2019/115266, dated Feb. 15, 2019.

*Primary Examiner* — Thomas M Sember
(74) *Attorney, Agent, or Firm* — Valeo Vision

(57) ABSTRACT

The present disclosure provides a pattern projecting lamp and a motor vehicle-in particular, a motor vehicle comprising a pattern projecting lamp. The pattern projecting lamp comprises an optical module configured to provide a projection light beam having a pattern, a support comprising a base and a rotary arm connected rotatably to the base, wherein the optical module is disposed in the rotary arm, and the rotary arm is provided with a light exit for the projection light beam to be emitted through. The pattern projecting lamp can project a light beam having a predetermined pattern at a suitable angle, as tailored to display additional information or provide auxiliary illumination on the vehicle body of the motor vehicle or at a peripheral region of the motor vehicle.

8 Claims, 8 Drawing Sheets

PATTERN PROJECTING LAMP OF MOTOR VEHICLE

CROSS-REFERENCE TO RELATED APPLICATIONS

This application is filed under 35 U.S.C. § 371 U.S. National Phase of International Application No. PCT/CN2018/115266 filed Nov. 13, 2018 (published as WO2019105223), which claims priority benefit to Chinese application No. 201721648707.9 filed on Nov. 29, 2017 (published as CN207584671U), the disclosures of which are herein incorporated by reference in their entirety.

TECHNICAL FIELD

The present disclosure relates to a pattern projecting lamp and a motor vehicle.

BACKGROUND ART

A lamp is a necessary component of a motor vehicle, and is also an important tool for ensuring normal driving and safety of the motor vehicle. At present, lamps on a motor vehicle mainly comprise road illumination lamps (such as low beam lamps and high beam lamps), signal lamps (such as direction indicator lamps, position lamps and brake lamps), and illumination lamps in the cabin. These lamps can only meet the basic needs of motor vehicle driving. However, as the demand for personalization of motor vehicles grows, the limited nature of these conventional lamps is gradually becoming apparent. For example, it is difficult for these lamps to realize the display of certain additional information.

SUMMARY

An object of the present disclosure is to provide a pattern projecting lamp for a motor vehicle, which is capable of projecting a light beam having a predetermined pattern as required, in order to realize the display of additional information. Another object of the present disclosure is to provide a motor vehicle comprising the pattern projecting lamp described above.

The present disclosure provides a pattern projecting lamp for a motor vehicle comprising an optical module configured to provide a projection light beam having a pattern, and a support comprising a base and a rotary arm connected rotatably to the base, wherein the optical module is disposed in the rotary arm, and the rotary arm is provided with a light exit for the projection light beam to be emitted through. Since the base is connected to the rotary arm rotatably, the rotary arm can occupy different operating positions, and it is thereby possible to project the projection light beam having the pattern to different regions, e.g. onto the ground or onto a vehicle body of the motor vehicle.

In one embodiment, the rotary arm further comprises a rotation shaft, and the base further comprises a supporting member for supporting the rotation shaft, such that the rotation shaft is rotatable at the supporting member. Preferably, the support further comprises an electric motor, the electric motor being arranged to drive the rotation shaft to drive the rotary arm to rotate.

In one embodiment, the rotary arm is also accommodatable in the base, hence the structure is more compact and structural space can be saved.

In one embodiment, the optical module comprises a light source arranged to emit a light beam, a printed circuit board on which the light source is disposed, a first lens arranged to collimate the light beam emitted by the light source, and a patterning apparatus arranged to form a pattern in a cross section of the collimated light beam, in order to generate the projection light beam having the pattern.

In one embodiment, the patterning apparatus is a light intensity modulating film, which has a first part and a second part having different transmittances for the light beam, in order to form the pattern in the cross section of the light beam that has passed through the light intensity modulating film.

In one embodiment, the patterning apparatus is disposed at the light exit of the rotary arm.

In one embodiment, the optical module further comprises a second lens, the second lens being arranged to focus the light beam that has passed through the patterning apparatus.

In one embodiment, the optical module further comprises a third lens, the third lens being arranged to collimate the light beam that has passed through the second lens.

Also provided in embodiments of the present disclosure is a motor vehicle comprising the pattern projecting lamp as described above.

The pattern projecting lamp as described in at least one of the above embodiments of the present disclosure can project a light beam having a predetermined pattern at a suitable angle as required, in order to display additional information or provide additional illumination on the vehicle body of the motor vehicle or in a peripheral region of the motor vehicle.

The pattern projecting lamp as described in at least one of the above embodiments of the present disclosure can project a light beam having a predetermined pattern at a suitable angle as required, in order to display additional information or provide additional illumination on the vehicle body of the motor vehicle or in a peripheral region of the motor vehicle.

The pattern projecting lamp as described in at least one of the above embodiments of the present disclosure can project a light beam having a predetermined pattern at a suitable angle as required, in order to display additional information or provide additional illumination on the vehicle body of the motor vehicle or in a peripheral region of the motor vehicle.

DETAILED DESCRIPTION

The technical solution of the present disclosure is explained in further detail below by means of embodiments, in conjunction with the drawings. In this description, identical reference labels indicate identical or similar components. The following explanation of embodiments of the present disclosure with reference to the drawings is intended to explain the overall concept of the present disclosure, and should not be interpreted as a limitation of the present disclosure.

Furthermore, in the detailed description below, to facilitate explanation, many specific details are expounded in order to provide a comprehensive understanding of the embodiments of the present disclosure. However, it is obvious that one or more embodiments could also be implemented without these specific details.

Figure 1:
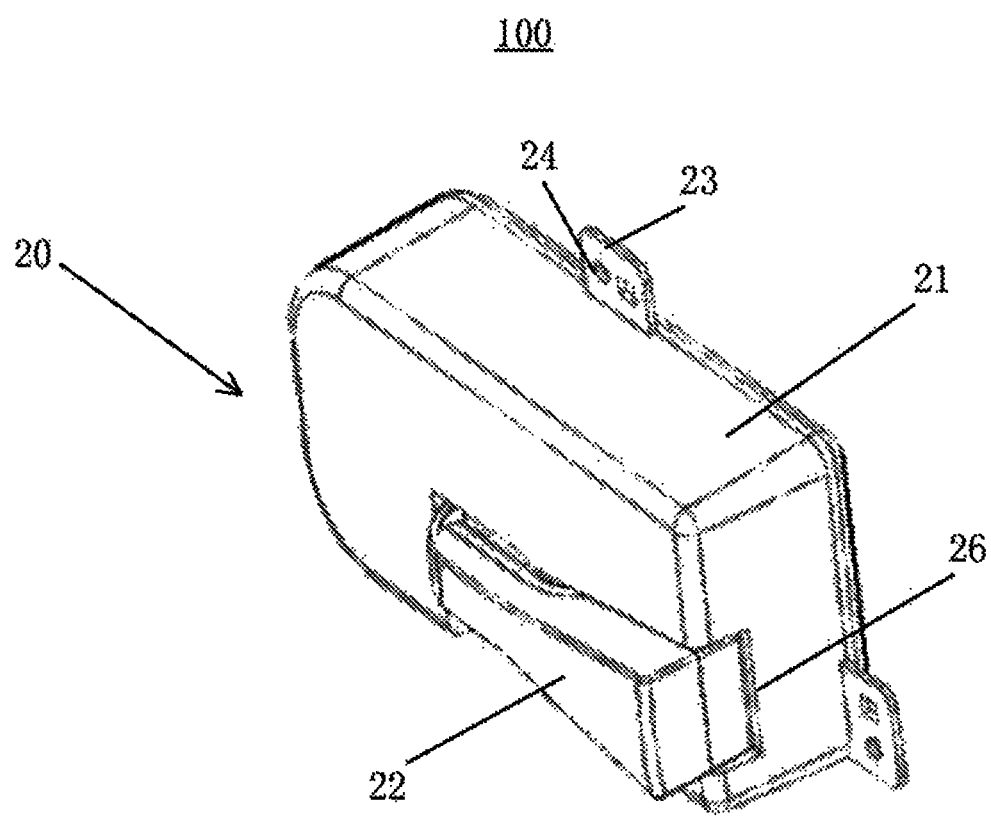
FIG. 1 shows schematically a perspective drawing of the pattern projecting lamp according to an embodiment of the present disclosure, wherein the rotary arm is accommodated in the base.
Figure 2:
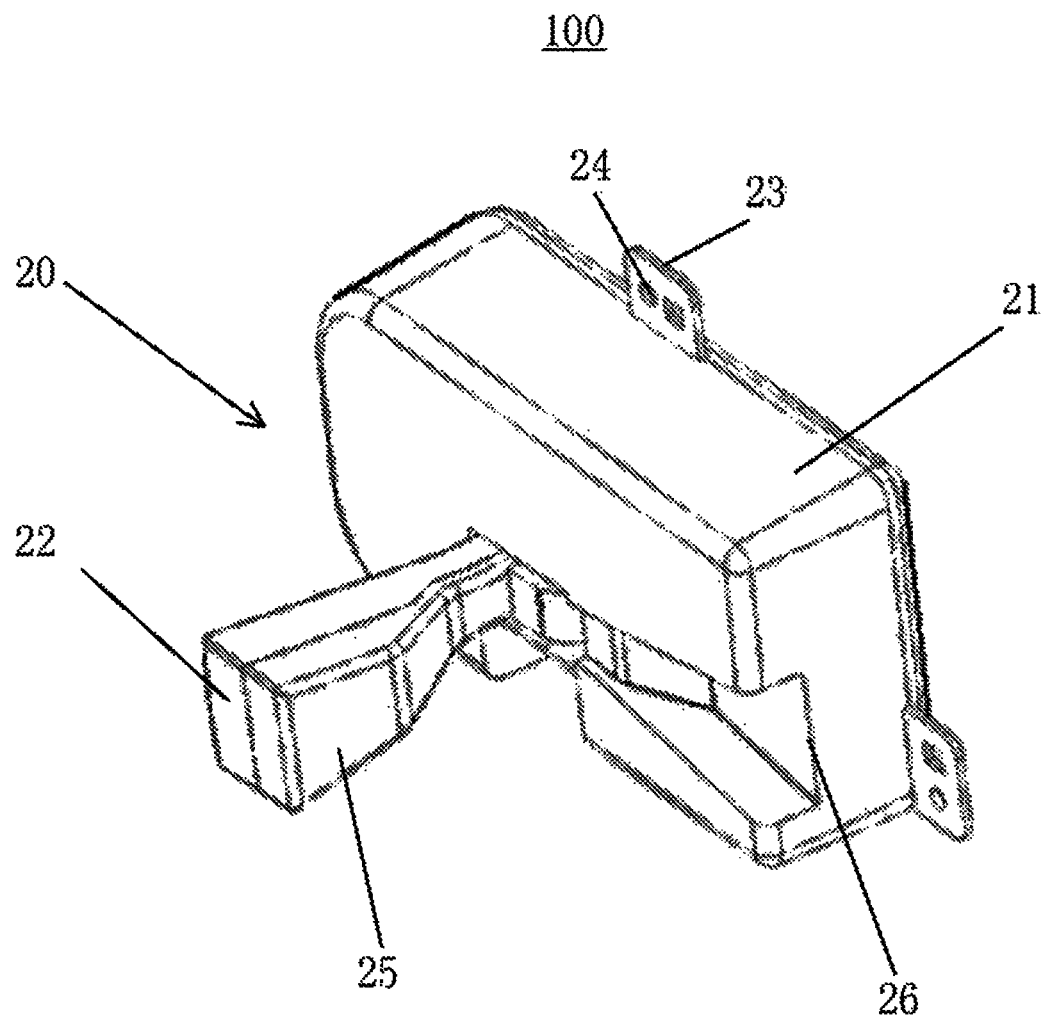
FIG. 2 shows schematically a perspective drawing of the pattern projecting lamp according to an embodiment of the present disclosure, wherein the rotary arm is in an operating position.

FIGS. 1 and 2 show schematic drawings of a pattern projecting lamp 100 for a motor vehicle according to an embodiment of the present disclosure. The pattern projecting lamp 100 has a support 20. The support 20 mainly comprises a base 21 and a rotary arm 22. The base 21 may for example be connected to the motor vehicle. In the examples of FIGS. 1 and 2, a connecting lug 23 is provided on the base 21, and a connecting hole 24 is further provided in the connecting lug 23. As an example, the base 21 may be mounted on any suitable part of the motor vehicle (e.g. a vehicle door, rear view mirror, chassis, etc.) by means of the connecting lug 23 (e.g. connected by means of a screw passing through the connecting hole 24). However, embodiments of the present disclosure are not limited to this; various other known mechanical connection methods in the art may be used to connect the base 21 to the motor vehicle. An optical module 10 is provided in the rotary arm 22 (not shown in FIGS. 1 and 2 due to being obscured, see FIGS. 5-8); the optical module 10 can provide a projection light beam having a pattern. The rotary arm 22 is provided with a light exit 25; the projection light beam having the pattern, provided by the optical module 10, can be emitted through the light exit 25.

The rotary arm 22 has at least two rotation positions. As shown in FIG. 1, the rotary arm 22 is in a recovered state, the light exit 25 is covered by the base 21. Here, an accommodating recess 26 may be provided in the base 21, the accommodating recess being used to accommodate the rotary arm 22, in order to make the structure more compact and save space. As shown in FIG. 2, when the rotary arm 22 is in the operating position, the light exit 25 avoids the base 21. At this time, the rotary arm 22 is in an opened state. Since the light exit 25 is no longer covered by the base 21, the projection light beam may be projected through the light exit 25 to the outside of the pattern projecting lamp 100. As an example, the projection light beam emitted through the light exit 25 may be projected to any region in which it is desired that a pattern be displayed, such as a vehicle body of the motor vehicle or the ground.

The pattern projecting lamp 100 according to an embodiment of the present disclosure enables a predetermined pattern to be displayed in a desired region. The pattern may for example comprise a logo of a motor vehicle brand, a logo of a manufacturer of the motor vehicle or a vehicle component, textual prompt information, or any other graphics/symbols, etc. The pattern projecting lamp 100 may also be used for auxiliary illumination of the motor vehicle. As an example, the pattern projecting lamp 100 according to an embodiment of the present disclosure may be mounted on a vehicle door. When the vehicle door is opened, the pattern projecting lamp 100 may project a predetermined pattern (e.g. a vehicle logo, information for reminding a passenger to close the vehicle door, or information for welcoming the passenger, etc.) onto the ground. This helps to improve the passenger's experience of riding in the vehicle. Moreover, the pattern projecting lamp 100 can itself also serve a certain illuminating function. This also helps the passenger to get in or out of the vehicle, especially in relatively dim environments. Those skilled in the art should understand that embodiments of the present disclosure are not limited to this, for example, the pattern projecting lamp 100 could also be mounted on any other part of the motor vehicle.

Due to the design feature of having the rotary arm 22, the pattern projecting lamp 100 according to an embodiment of the present disclosure can freely select a projection angle, in order to adapt to different projection requirements of users.

Figure 5:
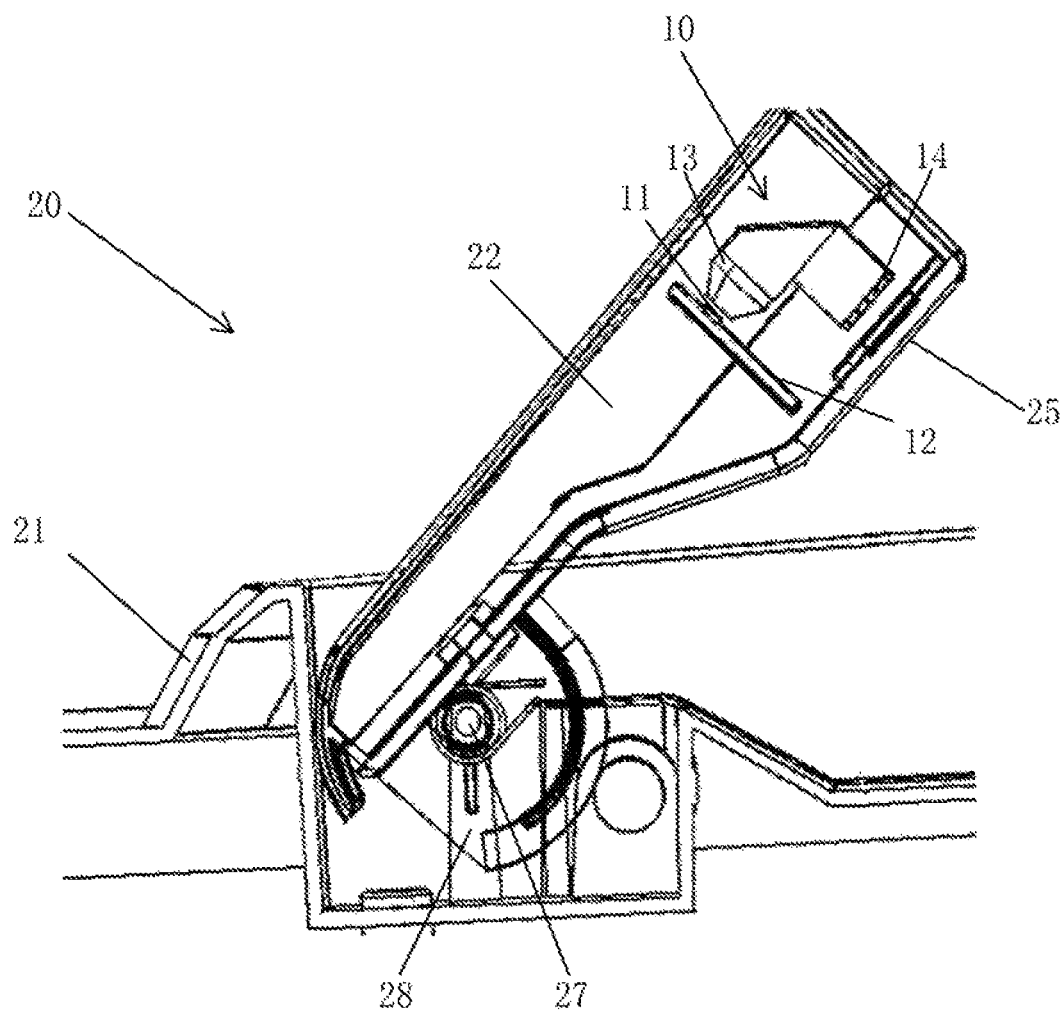

In the pattern projecting lamp according to an embodiment of the present disclosure, the rotary arm 22 may have multiple rotation positions. As shown in FIG. 5, as an example, the rotary arm 22 may also have another operating position. When the rotary arm 22 rotates to the operating position shown, the light exit 25 is also not covered by the base 21. Moreover, a projection region of the light exit 25 is different from a projection region of FIG. 2. For example, one projection region is disposed on the ground, and the other projection region is disposed on the vehicle body of the motor vehicle. This enables the pattern projecting lamp 100 to separately project a pattern in different regions. Different rotation positions of the rotary arm 22 may be realized by different rotation angles of the rotary arm 22. For example, the rotary arm 22 may rotate through rotation angles of 0 degrees, 90 degrees and 45 degrees.

Figure 3:
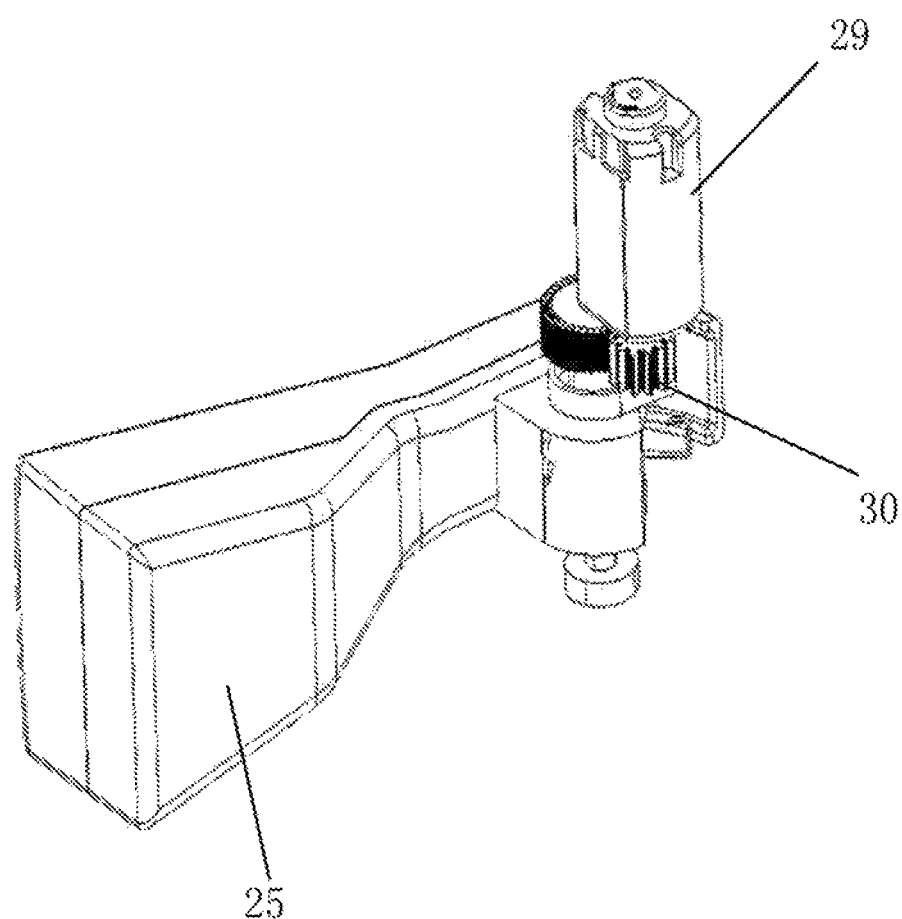
FIG. 3 shows schematically a perspective drawing of the rotary arm in the pattern projecting lamp according to an embodiment of the present disclosure.
Figure 4:
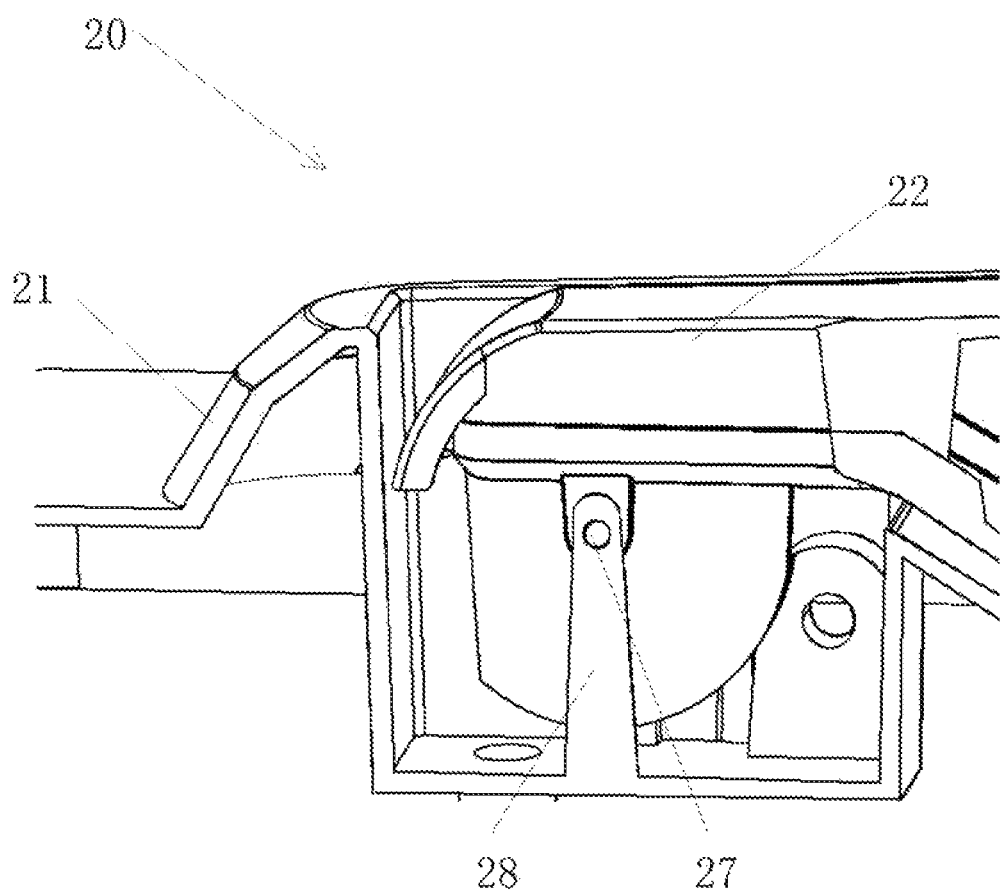
FIGS. 4, 5 and 6 respectively show schematically partial sectional views of the pattern projecting lamp according to an embodiment of the present disclosure in different states.
Figure 6:
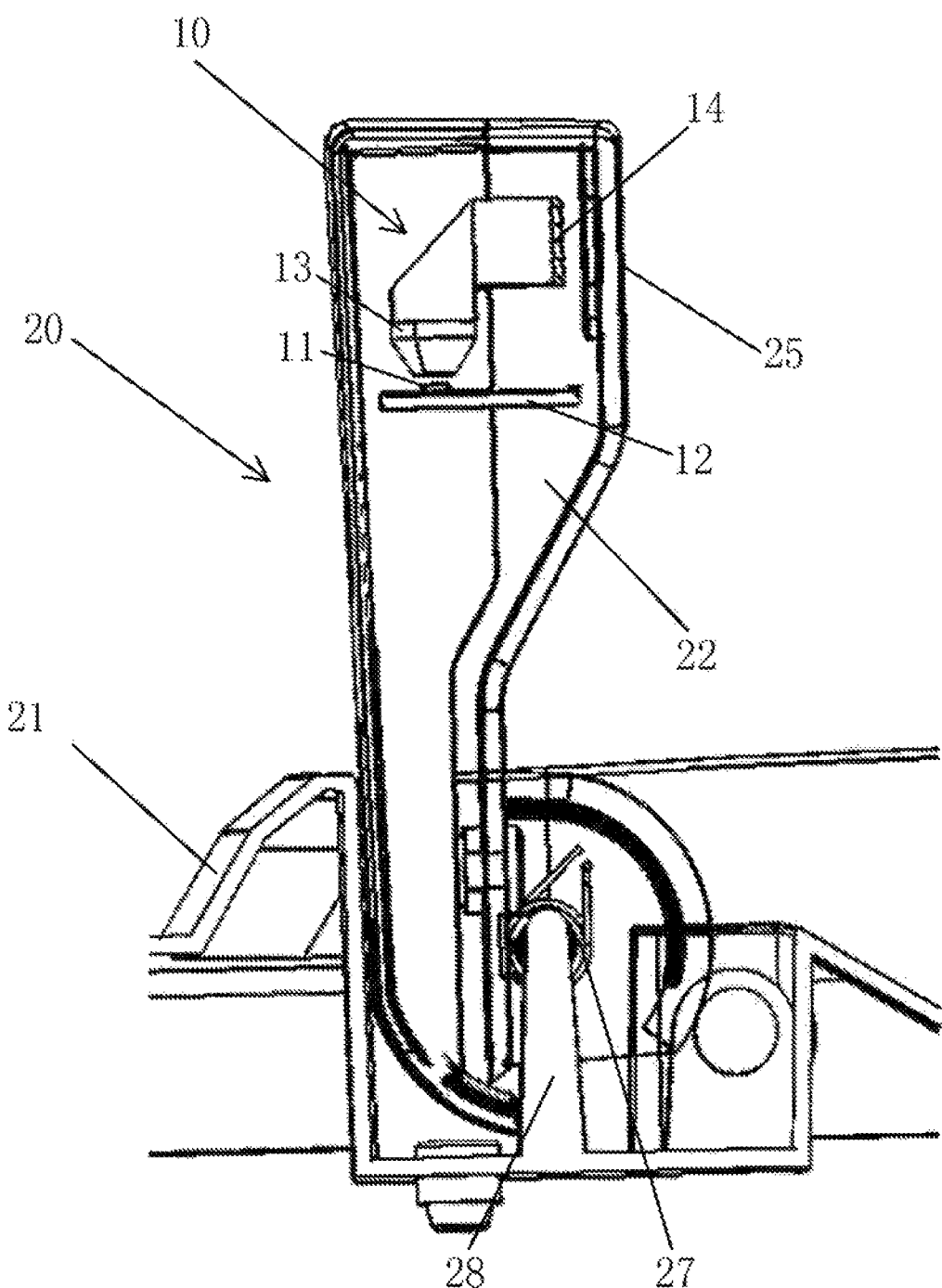

As an example, as shown in FIGS. 4-6, the rotary arm 22 may also be provided with a rotation shaft 27, and correspondingly, a supporting member 28 may also be provided on the base 21. The supporting member 28 supports the rotation shaft 27, such that the rotation shaft 27 can rotate at the supporting member 28. For example, the supporting member 28 may be provided with a supporting hole, in order to support the rotation shaft 27 passed into the supporting hole. In order to drive and control the rotation of the rotary arm 22 more effectively, as an example, the support 20 may also comprise an electric motor 29 as shown in FIG. 3, the electric motor 29 being arranged to drive the rotation shaft 27 in order to drive the rotary arm 22 to rotate. For example, in order to increase the drive efficiency, a drive gear set 30 may also be provided between the rotation shaft 27 and the electric motor 29.

The optical module 10 in the pattern projecting lamp 100 according to an embodiment of the present disclosure is described below in conjunction with FIGS. 5-8.

Figure 7:
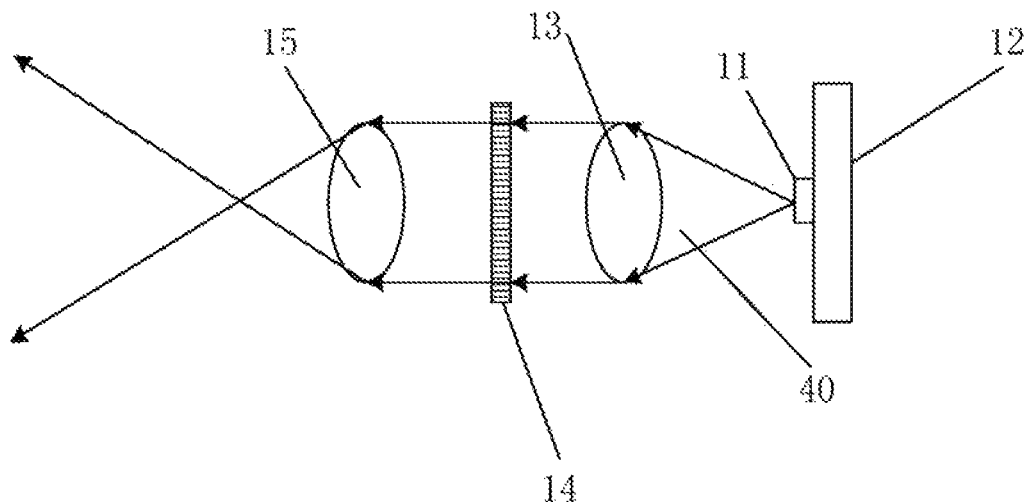
FIGS. 7 and 8 respectively show schematically examples of the optical module in the pattern projecting lamp according to an embodiment of the present disclosure.

As described in FIG. 7, the optical module 10 may comprise a light source 11, a printed circuit board 12, a first lens 13, a patterning apparatus 14 and a second lens 15. The light source 11 may for example be a known light source in the art such as a light-emitting diode, and is capable of emitting a light beam 40. The printed circuit board 12 is used for bearing the light source 11. The printed circuit board 12 may for example also be provided with a necessary circuit for driving the light source 11. The first lens 13 is arranged to collimate the light beam 40 emitted by the light source 11, and thereby increase the optical efficiency. The patterning apparatus 14 is capable of forming a pattern in a cross section of the collimated light beam 40, in order to generate the projection light beam having the pattern. The patterning to which the patterning apparatus 14 subjects the light beam 40 may for example be realized by light intensity modulation. The second lens 15 is arranged to focus the light beam 40 that has passed through the patterning apparatus 14. In a light path, the patterning apparatus 14 may be arranged between the first lens 13 and the second lens 14. It must be explained that the second lens 15 is an optional component. In the case where no second lens 15 is provided, a projection light beam having a pattern can still be generated. The second lens 15 may be used to change a projection area of the projection light beam. Although the second lens 15 focuses the light beam 40, the focused light beam 40 will become a divergent light beam after passing through a point of focus, due to optical properties. Thus, when the pattern is projected to a position that is relatively distant from the second lens 15 (e.g. several times or several tens of times the focal length of the second lens 15), the second lens 15 can significantly increase the projection area of the pattern. As an example, in order to save space, an element such as a reflector or prism may be inserted in the light path such that the light path is folded.

Figure 8:
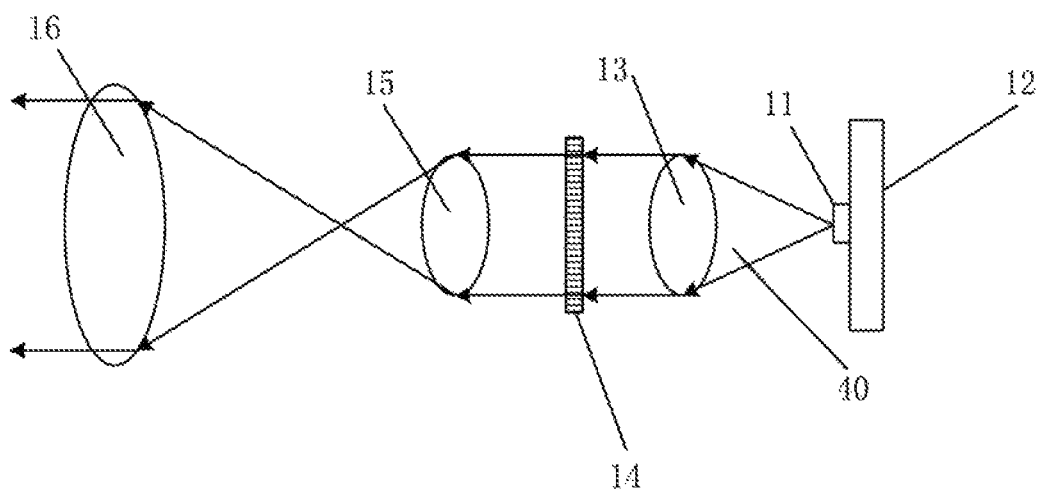

FIG. 8 shows another example of the optical module 10. This example differs from the example shown in FIG. 7 in that a third lens 16 is also provided. The third lens 16 may be arranged to collimate the light beam that has passed through the second lens 15. The third lens 16 may be used to give the light beam emerging from the optical module 10 better directionality.

Figure 9:
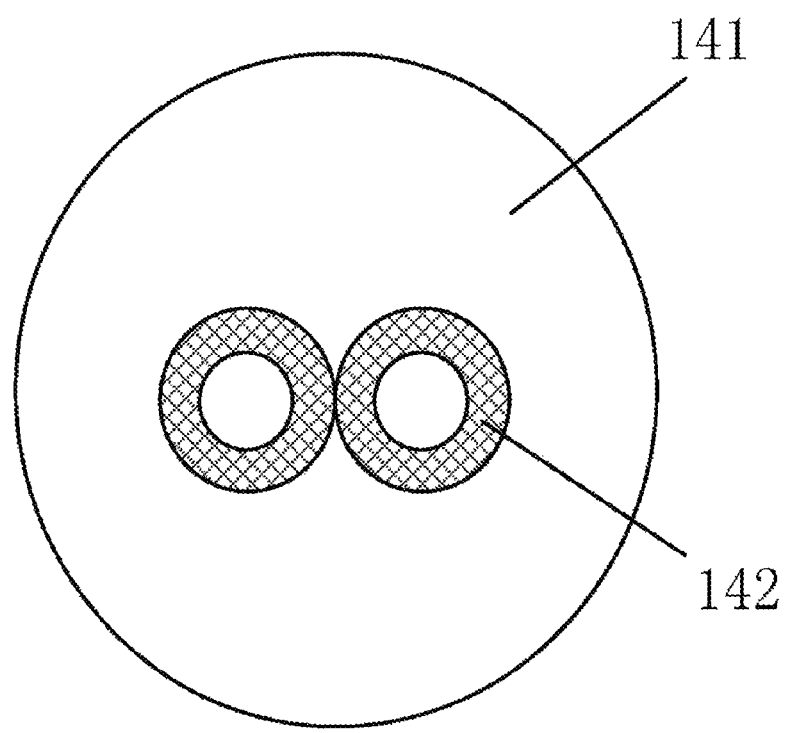
FIG. 9 shows schematically an example of the patterning apparatus in the pattern projecting lamp according to an embodiment of the present disclosure.

FIG. 9 shows schematically an example of the patterning apparatus 14 in the pattern projecting lamp according to an embodiment of the present disclosure. In this example, the patterning apparatus 14 is a light intensity modulating film. The light intensity modulating film has a first part 141 and a second part 142. The first part 141 and second part 142 have different transmittances for the light beam, and it is thus possible to form a pattern in the cross section of the light beam that has passed through the light intensity modulating film. In FIG. 9, the first part 141 is shown as two circular ring parts, and the second part 142 is the parts other than the two circular rings. However, embodiments of the present disclosure are not limited to this. The first part 141 and the second part 142 may be designed to have any shape according to the requirements of the projected pattern. Moreover, in embodiments of the present disclosure, the quantity of the parts of the patterning apparatus 14 which have different transmittances is not limited to two, a greater number of parts having different transmittances may be provided according to the requirements of the projected pattern in order to form a richer pattern. In embodiments of the present disclosure, the patterning apparatus 14 is also not limited to a light intensity modulating film, patterning apparatuses of other forms known in the art may also be used in embodiments of the present disclosure.

In one example, in order to make the structure more compact, the patterning apparatus 14 may be disposed at the light exit 25 of the rotary arm 22. In the pattern projecting lamp 100 in an embodiment of the present disclosure, the light exit 25 of the rotary arm 22 may be configured as a mechanical opening, but could also be realized by a light-transmitting part located at this position. That is to say, the light exit 25 of the rotary arm 22 does not mean that the rotary arm 22 must have an opening at this position in a physical sense. It merely means that the light beam is able to emerge from this position, e.g. it is only necessary to configure this region of the rotary arm 22 to be light-transmitting. In the case where the light exit 25 of the rotary arm 22 is formed by a light-transmitting part, as an example, the patterning apparatus 14 may be disposed on an inner wall of the light-transmitting part. It is even possible for the light-transmitting part to be used as the patterning apparatus 14 directly, by drawing a corresponding pattern on the light-transmitting part at the light exit 25 of the rotary arm 22. However, the present disclosure is not limited to this. For example, the patterning apparatus 14 may be disposed at any position, lying between the first lens 13 and the light exit 25, in the light path. As an example, the light exit 25 of the pattern projecting lamp 100 according to an embodiment of the present disclosure may be disposed at a position 1 m-1.5 m from the projection region (e.g. the ground).

As an example, the rotary arm 22 and the base 21 may both be integrally made of a material such as glass, plastic or resin. The patterning apparatus 14 may for example be made of a material such as polyethylene terephthalate (PET) or polymethyl methacrylate (PMMA). As an example, the first lens 13, the second lens 15 and the third lens 16 may be made of a material such as polycarbonate (PC) or polymethyl methacrylate (PMMA).

The present disclosure also provides a motor vehicle comprising the pattern projecting lamp 100 as described above.

Although the present disclosure has been explained in conjunction with the drawings, the embodiments disclosed in the drawings are intended to provide an exemplary illustration of preferred embodiments of the present disclosure, and must not be interpreted as a limitation of the present disclosure. The dimensional proportions in the drawings are merely schematic, and must not be interpreted as a limitation of the present disclosure.

Although some embodiments of the overall concept of the present disclosure have been shown and explained, those skilled in the art will understand that changes may be made to these embodiments without departing from the principles and spirit of the overall concept of the present disclosure. The scope of the present disclosure is defined by the claims and their equivalents.

What is claimed is:

1. A pattern projecting lamp of a motor vehicle comprising:
   an optical module configured to provide a projection light beam having a pattern, wherein the optical module comprises:
   a light source arranged to emit a light beam,
   a printed circuit board on which the light source is disposed,
   a first lens arranged to collimate the light beam emitted by the light source, and
   a patterning apparatus arranged to form a pattern in a cross section of the collimated light beam, in order to generate the projection light beam having the pattern; and
   a support comprising a base and a rotary arm connected rotatably to the base;
   wherein the rotary arm is accommodated in the base, wherein the rotary arm further comprises a rotation shaft, and the base further comprises a supporting member for supporting the rotation shaft, such that the rotation shaft is rotatable at the supporting member;
   wherein the support further comprises an electric motor, the electric motor being arranged to drive the rotation shaft to drive the rotary arm to rotate;
   wherein the patterning apparatus is a light intensity modulating film, which has a first part and a second part having different transmittances for the light beam, in order to form the pattern in the cross section of the light beam that has passed through the light intensity modulating film.

2. The pattern projecting lamp as claimed in claim 1, wherein the optical module is disposed in the rotary arm, and the rotary arm is provided with a light exit for the projection light beam to be emitted through.

3. The pattern projecting lamp of claim 1, wherein the patterning apparatus is disposed at the light exit of the rotary arm.

4. The pattern projecting lamp of claim 1, wherein the optical module further comprises a second lens arranged to focus the light beam that has passed through the patterning apparatus.

5. The pattern projecting lamp of claim 4, wherein the optical module further comprises a third lens arranged to collimate the light beam that has passed through the second lens.

6. A motor vehicle comprising the pattern projecting lamp of claim 1.

7. A pattern projecting lamp of a motor vehicle comprising:
- an optical module configured to provide a projection light beam that produces a pattern, wherein the optical module comprises:
  - a light source configured to emit a beam of light;
  - a patterning apparatus configured to generate the projection light beam from a pattern formulation derived from a cross section of the collimated light beam; and
- a support comprising a base and a rotary arm, the rotary arm rotatably connected to the base and configured to be fully accommodated within a recess of the base;
- wherein the rotary arm further includes a rotation shaft, wherein the base further includes a supporting member for the rotation shaft, such that the rotation shaft pivots at the supporting member;
- wherein the support further comprises a drive motor that is adapted to drive the rotation shaft that articulates the rotary arm;
- wherein the patterning apparatus includes a light intensity modulating film, which has a first part and a second part having different light transmittances for the light beam that passes through the light intensity modulating film.

8. A motor vehicle comprising the pattern projecting lamp of claim 7.

* * * * *